Figure 5:
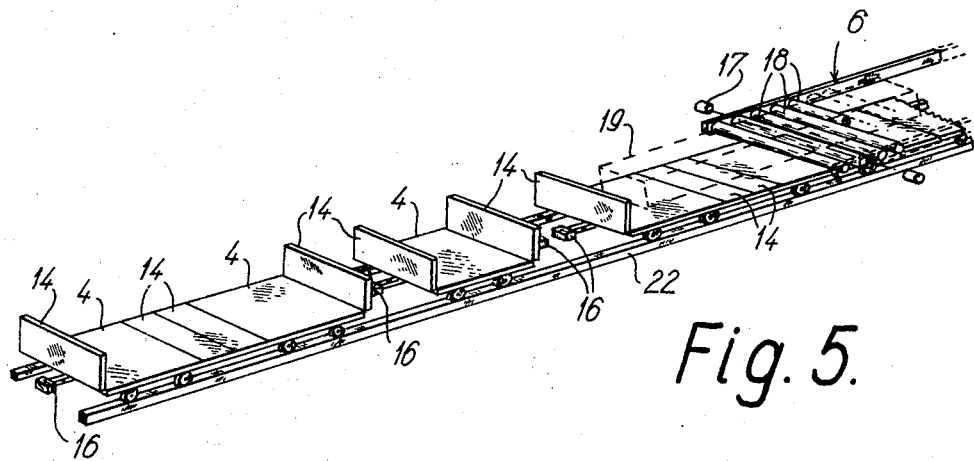

United States Patent
Christensen

[15] 3,662,906
[45] May 16, 1972

[54] CONVEYOR SYSTEMS

[72] Inventor: Svend Christensen, Risskov, Denmark
[73] Assignee: Crisplant A/S, Risskov, Denmark
[22] Filed: Sept. 2, 1970
[21] Appl. No.: 68,843

[30] Foreign Application Priority Data

Sept. 2, 1969 Great Britain......................43,342/69

[52] U.S. Cl..........................214/41, 104/172 BT, 105/367, 213/75
[51] Int. Cl........................................................B65g 67/12
[58] Field of Search..........................................214/41, 42 R

[56] References Cited

UNITED STATES PATENTS 1,691,881  11/1928  Fuller..................................214/41 X
3,091,188  5/1963  Graham...............................214/42 X

*Primary Examiner*—Robert G. Sheridan
*Attorney*—Craig, Antonelli & Hill

[57] ABSTRACT

A conveyor system comprising a number of carrier vehicles each having a load supporting platform operable to receive articles to be conveyed, driving means for said vehicles, and means for guiding said vehicles along a predetermined track, said track extending past a feeding station and at least one unloading station, said feeding station adjacent said track having transfer means operable to transfer articles to said vehicles during presence of vehicles in said feeding station, said unloading station adjacent said track having means operable to effect unloading of said articles from the vehicles, said vehicles being provided with releasable coupling means operable to couple together two consecutive vehicles in such a manner that the load supporting platforms thereof form a substantially unbroken platform of a length bigger than that of the platform of a single vehicle, detector means being provided adjacent said feeding station for detecting the length of each article transferred to said vehicles, said detector means being operatively connected to actuator means for said coupling means so as to effectively provide coupling together of at least two consecutive vehicles in response to said detector means detecting the length of an articles under transfer from the feeding station to exceed the length of the platform of a single vehicle.

10 Claims, 7 Drawing Figures

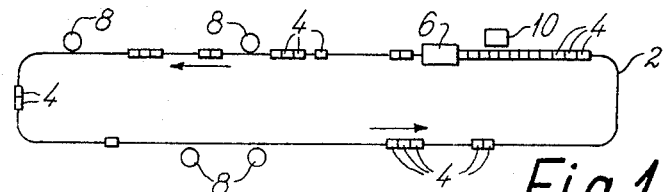
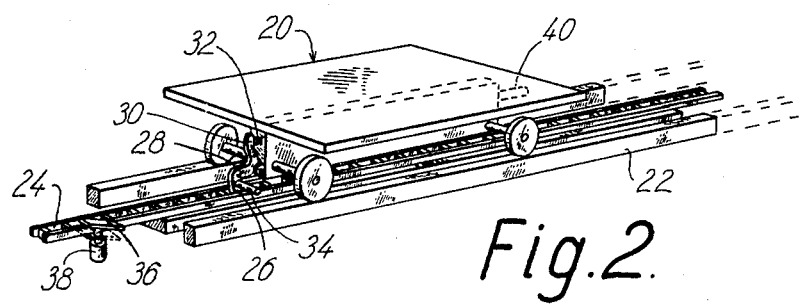
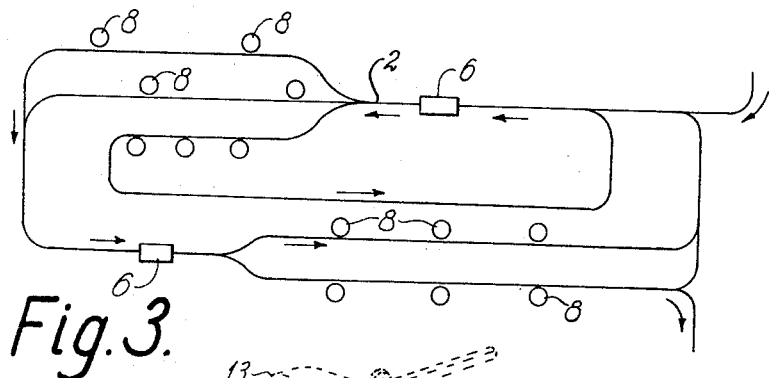
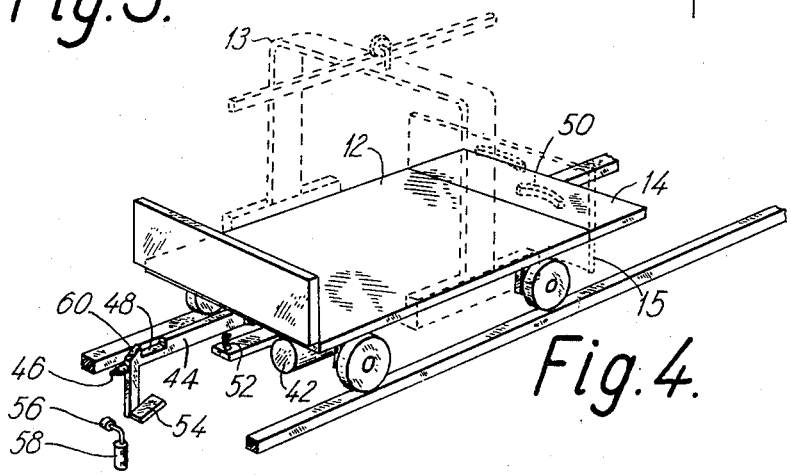
INVENTOR.
SVEND CHRISTENSEN
BY Craig, Antonelli, Stewart + Hill
ATTORNEYS.

INVENTOR.

SVEND CHRISTENSEN

BY Craig, Antonelli, Stewart & Hill
ATTORNEYS.

INVENTOR.
SVEND CHRISTENSEN
BY Craig, Antonelli, Stewart & Hill
ATTORNEYS.

CONVEYOR SYSTEMS

The present invention relates to conveyor systems and more particularly though not exclusively to a sorting conveyor of the type comprising a number of carrier elements adapted to be moved past a feeding station in which articles to be conveyed are deposited thereon, further past a number of discharging stations in which the articles are selectively transferred from the carriers to a receiving device each representing a specific destination for the articles, and thereafter back to the feeding station. If the conveyor is not used as a sorter there may be one discharging station only.

It is known in the art to use a number of individual carriers for the articles; especially in case of a sorter these carriers or vehicles shall need to have a length sufficient for safely carrying the articles of the biggest length which becomes actual, i.e. when handling articles of different lengths it will frequently occur that the carriers are longer than the articles they carry, and for this reason the conveyor will normally be overdimensioned since its top capacity cannot in practice be utilized.

It is also known to use a continuously moving conveyor belt and to feed the articles to this belt with a predetermined distance between the rear end of the first article and the leading and of the next article, whereas in the discharging stations diverter means are provided so as to be able to divert the article with a performance corresponding to the particular length of the article to be diverted. In this manner the full capacity of the conveyor means may be utilized irrespectively of differences in the lengths of the articles, but also this system involves an overdimensioning because there will be periods of time in which there are not articles enough to be fed to the belt at a rate corresponding to the top capacity. Of course, the belt may be driven at reduced speed in case of a slow rate of feed, but no considerable saving is obtained thereby. The problem is especially important in connection with that kind of conveyors in which the said belt consists of a train of individual slats or corresponding carriers which are adapted to additionally operate as diverter means by carrying out a tilting movement when a particular group thereof reaches the desired discharging station, viz. a group of a total length corresponding to the length of the article supported thereon. A belt of this kind is of course relatively expensive, so the total number of slats should be kept as low as possible. However, they shall be placed in close relationship along the entire length of the belt, and the belt shall be long enough to pass all discharging stations so if for some reason these stations are not located close to each other the ratio between the price and the capacity of the belt will increase considerably.

It is the purpose of the invention to provide a conveyor system in which the said disadvantage of the known systems are eliminated or considerably reduced.

According to the invention there is provided a system comprising a plurality of individual carrier vehicles for the articles to be conveyed, said vehicles being individually movable along the conveying line and having connecting means operable to interconnect each vehicle with the foregoing and/or the subsequent vehicle in such a position relatively thereto that the interconnected vehicles present aligned supporting means for an article resting thereon. The vehicles may hereby be interconnected in a number sufficient to constitute an integrated supporting surface of sufficient length to carry an article of any particular length, and the group of vehicles forming this surface may be moved as a unit at least until they reach the selected discharging station in which the diversion may be effected by any convenient means including, e.g. tilting means for the said supporting surface. The next group of vehicles (or a sole vehicle in case of a sufficiently short article) may be sent out from the feeding station independently of the time of departure of the first group, i.e. with any spacing from the first group as determined by the rate of feed of the articles. In case of a reduced rate of feed there will be no vehicles running idle out from the feeding station, i.e. the degree of utilization of the vehicles may always be optimal, and the entire system may be dimensioned in accordance therewith. Means should be provided, of course, to cause a release of the said interconnection at the latest when the vehicle groups have returned to the feeding station or reach another feeding station.

It will be appreciated that the number of vehicles need not necessarily be higher if the distance between the feeding station and the discharge stations or between the discharge stations mutually is increased, and also that during a certain time the conveyor may work with top capacity without being provided with closely arranged vehicles along the entire length thereof; if at a given time there is a certain number of vehicles waiting behind the feeding station these vehicles may — individually or in groups — be charged and delivered rapidly from the feeding station, and the total number of vehicles may easily be adapted so as to ensure that there are always vehicles enough to take the articles according to their rate of supply, without working with a number higher than necessary for receiving the average number of articles per time unit throughout each period of fluctuation in the rate of supply of the articles.

Figure 6:
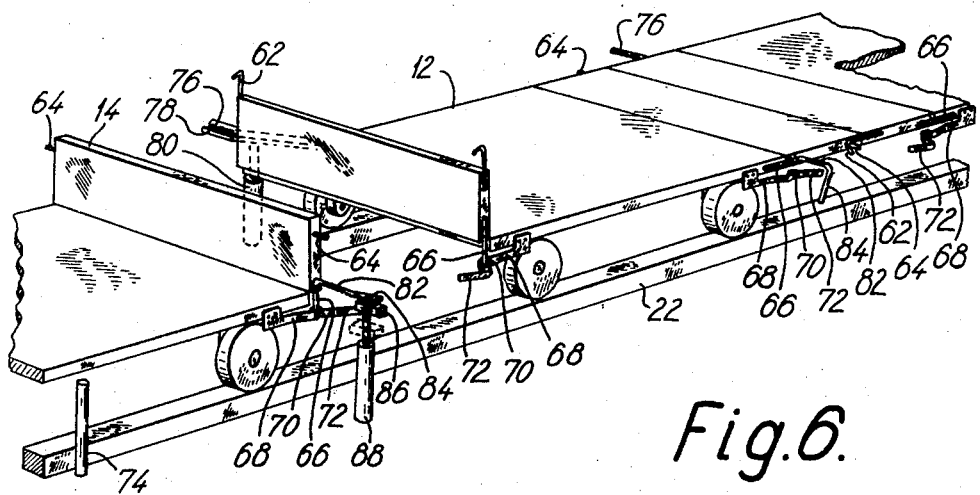
Figure 7:
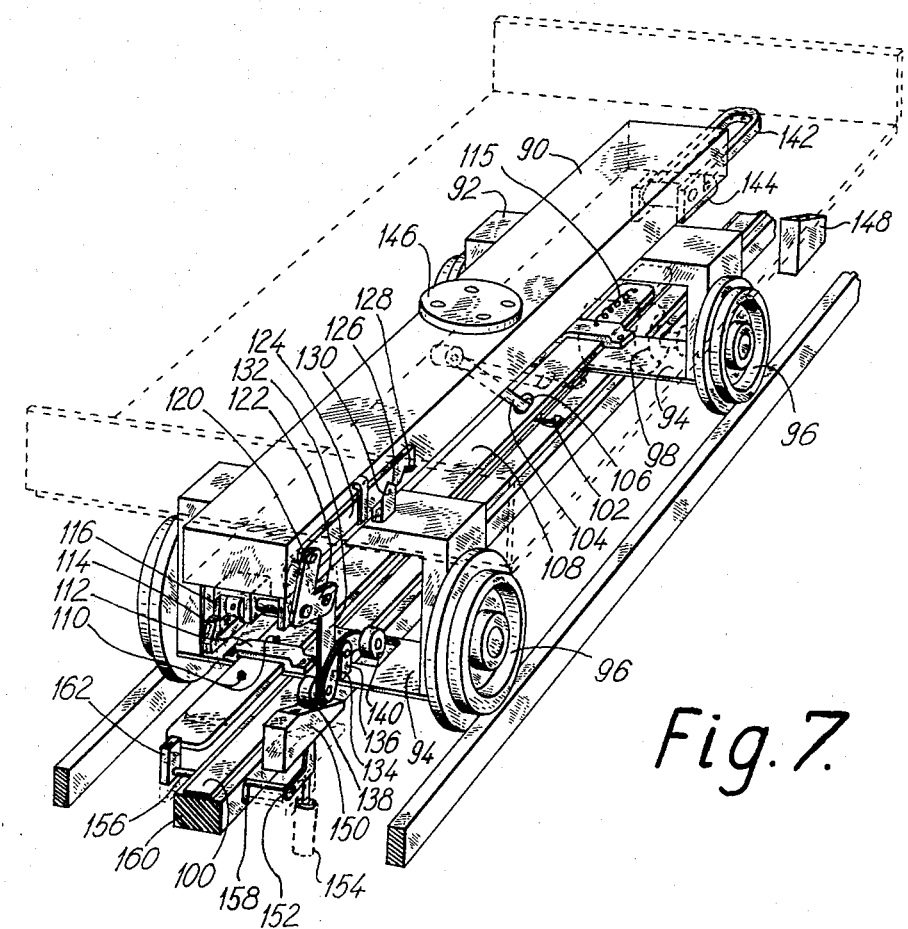

The invention is examplified in the accompanying drawing in which:

FIG. 1 is a schematic top view of a conveyor system according to one embodiment of the invention, FIG. 2 is a perspective view of a vehicle for use in this system, FIG. 3 is a schematic view of another embodiment of the conveyor system, FIG. 4 is a schematic perspective view of another embodiment of a vehicle for use in the system according to the invention, FIG. 5 is a corresponding view of a number of vehicles in the system, FIG. 6 is a similar view showing some further details, and FIG. 7 is a perspective view, partly in section, of a modified embodiment of a cart for use in the system.

FIG. 1 shows a closed rail circuit 2 on which a number of individually movable carrier carts 4 are mounted so as to be able to move along the rail 2 past a feeding station 6 in which articles may be deposited on the carts, and pa t a plurality of discharging stations 8 in which the said articles may be diverted according to any known method of selecting a desired discharge station and effecting the diversion therein. As mentioned, the carts are adapted to be coupled together in any number sufficient to receive an article of any given length, so that for some articles it is sufficient to use a single cart, while for others it may be necessary to interconnect two or more carts in order to obtain sufficient support for the articles. For carrying out their movement the carts may be provided with means operable to engage a driving chain for corresponding driving means situated adjacent the rail 2, but especially in more complicated systems it is preferable to provide each part with an individual driving motor driven e.g. by means of a contact rail system.

The articles may be fed in different manners from the feeding station 6 to the carts 4, but the actual manner of loading the carts is of less importance for the invention; it is of course important that at the feeding place there is a sufficient number of carts to receive the article which is placed thereon in case the article is longer than one single cart. Preferably the system is so adapted that a number of carts is waiting at the introduction line to the feeding station in positions close to each other so that for loading the next group of carts, it is sufficient to place the front end of the article adjacent the leading edge of the first free cart and to interconnect or leave interconnected all the carts that actually serve to support the article, whereafter this group of carts may be sent out from the feeding station separated from the following carts. When the cart group reaches the discharge station 8 corresponding to the destination of the article, the said diverter means (not shown) are actuated and the article thereby removed from the carts, whereafter the cart group returns to the feeding station.

As described below each cart is provided with means for making its individual driving means inoperative when the cart drives against the rear end of its preceding cart. Therefore, when a cart is stopped in the feeding station in order to wait for the next article to be fed to the conveyor system, the carts returning to the feeding station will automatically line up themselves in an accumulation line section 5 in front of the feeding station. This row of carts will start moving when the first cart or carts are sent out from the station, in which automatical stop means are provided for releasably stopping the first of the following carts which is not needed for supporting the article being delivered from the feeding station. The operation of the said stop means may be controlled by e.g. photo electric switch means registering the length of the article according to any known method and causing as amny carts to be released as necessary for carrying the article, i.e. to thereafter stop the first cart which is not needed for this purpose, until the next article arrives.

The automatic release means may be operatively connected with means for effecting a coupling together of the number of carts necessary for each single article; in this case care should be taken to first release the connections between the carts before (or concurrently with) their return to the feeding station. This disconnection may take place when the carts pass a disconnection unit 10. Alternatively it may be chosen to let the unit 10 serve to souple all passing carts together and thereafter effect an automatical disconnection in the station 6 between carts which shall carry different articles.

FIG. 2 shows a cart 20 adapted for use in a system according to FIG. 1 in which the carts move on rails 22 driven by a single continuously moved driving chain 24. The driving connection between the cart and the chain is obtained by means of a chain engaging pin 26 mounted at the outer end of a two armed lever 28 the upper portion 30 of which is biased in forward direction by means of a spring 32. The pin 26 has a laterally protruding portion 34 by means of which the pin 26 may be lifted up from the chain 24 when the portion 34 is lifted by a suitable lifting device. Such a device should be located in the feeding station in order to stop the cart — and the following carts — in a releasable manner, and the device may comprise an inclined plate member 36 mounted so as to be movable by means of a stationary cylinder 38 between a raised position in which it is hit by the projection 34 so as to lift the projection by the movement of the cart until the pin 26 is disengaged from the chain and the cart stopped, and an inoperative low position in which it allows the projection 34 to pass without lifting it.

At the rear end the cart 20 is provided with a portion 40 mounted so as to be hit by the upper portion 30 of the lever 28 of a following similar cart when the cart 20 is stopped by the member 36 and the next cart arrives; hereby the member 28 of the next cart will automatically be swung so as to disengage the pin 26 from the chain. When the first cart is released from the feeding station by retraction of the stop member 36 the next cart will automatically be connected to the chain by the lowering of the pin 26, and it will follow the first cart directly with only small spacing between the platforms of the carts. The actuator member 36 is raised, when the article length detecting device registers that there is no need for a further cart in order to carry the particular article, so the next cart will be stopped by the member 36 until a new article is transferred to the "conveyor" in the feeding station. In this manner a number of carts 20 may perform the functions described in connection with FIG. 1.

FIG. 3 shows a more complex circuit in which rail switches are provided for bringing the carts or cart group to discharging stations along different tracks as shown by arrows. As shown, it is even possible to include more feeding stations 6 in the system, and in general it will be appreciated that the single carts are in no way limited to a movement in a specific closed circuit. In such complex systems it is preferable to use carts driven by individual motors.

A simple embodiment of a cart for use in the system is shown in FIG. 4. It consists of a wheel-supported loading platform 12 having a flap 14 hinged thereto at each end, these flaps being swingable between a position in alignment with the platform 12 and an upright position relatively thereto as shown in the left-hand side of FIG. 4. As described below in connection with FIGS. 5 and 6 means are provided adjacent the feeding station for operating the flaps between these two positions.

The cart 4 shown in FIG. 4 is provided with an individual driving gear motor 42 energized by means of a sliding shoe — contact rail — arrangement (not shown). On a forwardly protruding arm 44 there is mounted an end switch 46 serving to stop the motor 42 when the cart drives against the rear end of the preceding cart. The arm 44 is provided with an upper notch 48 adapted to receive a cross rib 50 at the rear side of the rear flap 14 of the preceding cart when this flap assumes its swung down position, whereby the two carts are coupled together. The arm 44 is downwardly swingable against the action of a spring 52 and has a lower extension provided with a forwardly downwardly inclined cam 54 adapted to cooperate with a roller 56 which is mounted on the piston rod of a stationary cylinder 58 so as to be movable between a raised position above the top level of the cam 54 and a low position in which, by the arrival of a cart, it is hit by the cam 54 and thus causes the arm 44 to be swung down so as to release the engagement between the notch 48 and the rib 50 of the preceding cart. Switch means (not shown) are provided in series with the switch 46 so as to be operated by the swinging down of the arm 44 in order to thereby switch off the motor 42.

The cylinder 58 serves the same purpose as the cylinder 38 in FIG. 2; normally the roller 56 assumes its low position in which it causes an arriving cart to stop and to be disengaged from its preceding cart. The roller is raised to its high position in connection with the start of a cart from the feeding station, and it is maintained in its high position as long as one or more additional carts are required for supporting the particular article; carts already coupled together before the feeding station will then pass the roller 56 until it is again lowered as controlled by the article length detecting device so as to hold back the following cart.

When the carts successively approach the feeding station their flaps 14 are automatically folded down as described below, and when thereafter a cart runs up into the preceding cart the arm 44, by virtue of an inclined surface 60 in front of the notch 48, will be swung down by the rib 50 and thereafter engage the rib by means of the notch 48, i.e. the carts are coupled together. The rib 50 has a slight longitudinal slip in the notch 48 so that by the action of the end switch 46 the motor of the cart will stop only when the cart is pressed against the preceding cart; when the first cart starts moving the said slip is sufficient to cause the switch 46 to start the motor of the following cart before this cart is actually pulled by the first cart. Thus, all carts accumulated at the feeding station will start moving when one or more carts are sent away from the station and stop when the first cart thereafter is stopped by the roller 56.

As more clearly shown in FIG. 5 the flaps 14 may be folded down to a position in which they bridge the space between the platforms 12 of two interconnected carts, whereby an entirely or almost unbroken supporting surface for articles to be placed thereon is obtained. The coupling means are shown schematically and designated 16.

In FIG. 5 there is schematically indicated a row of rollers 18 belonging to the feeding station 6 and situated slightly above the loading platforms 12 of the carts moved past the feeding station. When the carts are advanced in the feeding station all flaps 14 assume their folded down position, but the leading flap on the first cart is automatically swung up as soon as it has passed the front end of the roller section 18 by means of an automatical mechanism, e.g. as described in connection with FIG. 6. As the carts move further an article 19 is delivered thereto with the same advancing speed from the rollers 18 so that the front end of the article is placed immediately behind the said flap. Detecting means such as a photo-electric measuring equipment 17 registers when the leading edge of the article 19 approaches the end of the roller section 18 and serves to hereby operate the cylinder 58 (or 38 in FIG. 2) so as to allow the first cart — and therewith the entire row of accumulated carts — to start moving. Hereby the article is loaded onto the first cart or carts; in case of more carts these will remain coupled together because the detecting means are still actuating the cylinder 58. When the detecting means register the passage of the rear end of the article they cause the cylinder 58 to lower the roller 56 so as to thereby stop the following cart (and carts), and simultaneously they send a control signal to a mechanism for swinging up the rear end flap 14 on the cart on which the rear end of the article is placed, as soon as the cart leaves the roller section 18.

Instead of loading the articles by a movement in the longitudinal direction the articles may be fed from the side to the carts by a transverse movement preferably during stillstand of the carts; the said length detecting device may then register the passage of the rear end of the article as the article is moved away on the cart (carts) and thereby serve to hold the next cart back until a new article has been fed to the front end of the cart row in the feeding station. For such a transverse loading, and also for enabling a corresponding transverse unloading from the carts it may be advantageous to make use of carts provided with laterally movable surface portions as disclosed in our copending U.S. Pat. application, No. 86,520.

The said detecting device may be of the type disclosed in our copending U.S. Pat. application, No. 754,815, now U.S. Pat. No. 3,523,618, where the device is used in connection with article delivery from a feeding station to an endless conveyor belt.

FIG. 6 shows a row of carts according to a modified embodiment of the invention, and this figure also serves to illustrate the means for operating the end flaps 14 as referred to hereinbefore. In this embodiment the leading end flaps 14 are provided with hooks 62 cooperating with laterally protruding pins 64 on the rear flaps 14 so as to constitute coupling means when adjacent flaps assume their folded down positions. The flaps 14 are provided with pins 66 projecting over or beyond the hinge axis of the flaps so as to be swung downwardly when the flaps are swung upwardly. Underneath the platform 12 there is provided a snap lock for each of the pins 66, these locks being constituted by leaf springs 68 provided with notch bendings 70 for receiving the pins 66 with snap action when the flaps are swung upwardly. The free ends of the springs 68 are constituted by portions 72 which extends horizontally in in a rearwardly outwardly inclined position so as to have their outermost portions situated laterally spaced from the pins 66. It will be understood that in this manner the snap locking of the pins may be released by pressing the extended portions 72 inwardly whereby the flaps will fall down to their horizontal positions.

This swinging down of the flaps may be obtained by moving the carts past a rigid post 74 situated outside the movement path of the pins 66, but inside the path of the outermost portions of the extensions 72. All flaps will be consecutively swung down as the carts pass this post, which may be placed between the last unloading station in the system and the feeding station as seen in the moving direction of the carts.

As mentioned, the flap 14 adjacent the leading edge of a cart should be swung up to its upright position before the cart leaves the feeding station, i.e. it may if desired be done during stillstand of the cart. It is sufficient, therefore, that means of any suitable kind are provided for swinging up the front flaps of the first cart in the feeding station. In the example shown in FIG. 6, however, the flaps are directly used as coupling means, so care should be taken to swing up the front flap of the cart following the cart — or the last cart — which is about to leave the station with an article. In order to obtain this swinging up of the front flap all front flaps may be provided with a laterally protruding pin 76, whereas in the movement path of these pins there is arranged an inclined member 78 mounted on the piston rod of a cylinder 80 so as to be movable between an active position in which it causes the pin 76 of an arriving cart to slide upwardly along the member 78 and thus swing the flap upwardly into its locked position, and an inactive position above or below the pins 76 in which it allows the pins to pass freely. The cylinder 80 is actuated by the said detector device so as to maintain the member 78 inoperative as long as an article is under delivery from the feeding station and to make the member 78 operative as soon as the article has left the station, until the next article is ready for delivery to the following cart or carts.

In FIG. 6 the driving motor switch operated by the swinging of the arm 44 in FIG. 4 may be substituted by a similar switch operated directly by the member 78 in order to stop the cart in its waiting position. Otherwise the driving arrangement may be as in FIG. 4. Instead of a special stop switch operated by the arm 44 or the member 78 it will be possible to use a contact rail of which the portion cooperating with the sliding shoe of the cart assuming the said waiting position is operatively connected to the said detector means so as to be connected to the current source only as long as an article is under delivery from the feeding station; thereafter the said rail portion is electrically disconnected so as to stop the following cart until the next signal of departure is produced by the detector device or otherwise.

When an article has left the feeding station on one or more carts the rearmost flap 14 of the cart of carts should be swung to its upright position, and this may be done by means of an arrangement comprising a laterally protruding pin 82 mounted on the flap adjacent the hinge axis thereof and having at its outer end an angularly bent portion 84 which in the folded down position of the flap projects in a forwardly downwardly inclined position; in the movement path of this portion 84 there is provided an actuation member 86 mounted at the top of the piston rod of a cylinder 88 so as to be shiftable between a raised, operative position in which it is engaged by the lower end of the portion 84 when the cart is moved past the cylinder 88, whereby the rear flap 14 will be swung to its upright, snap-locked position, and a low inoperative position in which it allows free passage of the portions 84. The cylinder 88 is mounted immediately after the feeding station and is operated in parallel with the front flap raising cylinder 80 so as to cause raising of only the rearmost flap of the carts or cart leaving the station by each article delivery therefrom.

As mentioned, all raised flaps 14 are swung down by the passage of the post 74 before the carts arrive at the feeding station. When thereafter the front end of a cart runs into the rear end of the preceding cart with the respective flaps in folded down condition the hooks 62, due to an inclined front end portion 63 thereof, will automatically be lifted by the pins 64 and thereafter fall down at the other side of the pins so as to interlock the carts. The hooks may to this end be mounted as swingable pawl members, or they may project rigidly from the front flap so as to lift the entire flap slightly during the said interlocking operation.

If the rail system 2 includes relatively sharp curves the carts should, of course, be so adapted that two or more interlocked carts may pass the curves without jamming occuring between the platforms. In such cases the platforms (or the ends of the flaps) may be spaced somewhat from each other even in the interlocked condition, or they may overlap each other. In a given system it may be chosen to let the entire length of the system in which unloading stations are present be rectilinear and to cause general release of the interlockings immediately after the last unloading station, whereafter the individual carts may return to the feeding station (or proceed to a further station) through sharper curves.

Instead of swingable flaps 14 it will be possible to use permanently vertical boards as illustrated in dotted lines at 15 in FIG. 4, these boards, by automatical means corresponding to the means for operating the flaps 14 being vertically raisable from a position underneath the platform level.

Though in this description the term carts has been used for the carrier elements, it will be appreciated that these elements should not necessarily be constituted by actual carts supported by four wheels. Any other kind of vehicles may be used, even including float members supported and driven by a water flow. The system may also be used in connected with overhead conveyors, i.e. where the single supporting elements are hanging in a rail as indicated in dotted lines at 13 in FIG. 4. In this case the platforms may be divided into two halves along a longitudinal line whereby diversion of the articles may be obtained by means of an automatical mechanism (not shown) for moving or swinging these halves away from each other to thereby deposit the article on a surface underneath the platforms.

In FIG. 7 is in a more detailed view shown a further embodiment of a vehicle according to the invention, the vehicle chassis being shown in full lines while the platform is shown in dotted lines. The chassis comprises a longitudinal balk 90 which is provided adjacent each end with a lower wheel supporting structure 92 generally shaped as an inverted U-member. The lower ends of the sides of each of these structures are interconnected by means of a cross plate 94. The rail wheels are designated 96, and a gear motor 98 is mounted on the rear cross plate 94 so as to drive on one wheel pair only. Between the driving rails there is mounted a contact rail 100, and a sliding shoe 102 mounted on an arm 104 serves to engage the contact rail for energizing the motor 98. The arm 104 is pivotally secured to the underside of the balk 90 so as to be swingable in its longitudinal vertical plane. The arm 104 extends down through a hole 106 in an elongated plate member 108 which extends along the entire length of the vehicle supported by the cross plates 98 so as to be slidable in the longitudinal direction between the position shown in full lines, in which the hole 106 holds the arm 104 in a swung down contact position, and the rear position shown in dotted lines, in which the hole 106 holds the arm 104 in a swung up position, where the sliding shoe 102 is lifted up from the contact rail 100. Two stop pins 110 serve to limit the sliding movement of the plate 108 by cooperation with a rigid holding bridge member 112. A spring 114 serves to bias the elongated plate 108 in forward direction, i.e. to normally hold it in a position in which the sliding shoe 102 contacts the contact rail 100.

Adjacent the front end of the vehicle there is provided a hook 114 mounted in a bracket 116 underneath the front end of the balk 90. The hook is rigidly mounted on a transverse shaft 118 carrying at its outer end an angular member having an upwardly extending arm 120 and a rearwardly extending arm 122. The arm 120 is hinged to a horizontal lever 124 the underside of which is provided with two notches 126 and 128 of which the notch 126 is shown riding on a rigid, pointed post 130. The arm 122 is hinged to a vertical link arm 132 the lower end of which is hinged to the front end of an arched lever 134 pivotally supported by a rigid post 136 so as to be tiltable about a middle point thereof. The front end of the lever 134 holds a roller 138 adjacent the inner side of the lever, while the rear end thereof holds a roller 140 adjacent the outer side of the lever. In the positions shown the roller 138 assumes a low position and the roller 140 a high position, the lever 134 generally being forwardly downwardly inclined. The arm portion 120 is upwardly rearwardly inclined and the hook 114 generally points straight forwardly.

It will be understood that if the roller 138 is forced upwards from its low position the arm 120 will excert a pull in the lever 124, and due to the inclined wall of the notch 126 the lever 124 will hereby be raised and pulled forwardly until the notch 128 falls down over the post 130; simultaneously the hook 114 will be swung down to the position shown in dotted lines. If thereafter the rear roller 140 is forced upwardly the system will return to the position shown in full lines.

At the rear end of the vehicle there is mounted a rearwardly protruding coupling member 142 shaped as an elongated eye member which is held by brackets 144 so as to normally assume a horizontal position, but being free to swing slightly upwardly with its outer end. The eye member 142 is dimensioned and placed so as to be able to be caught by the hook 114 of another similar vehicle running against the rear end of the vehicle shown; the front side of the hook is inclined so that it will simply press the eye member 142 upwardly, and thereafter the eye member by gravity falls down behind the hook so as to effect coupling together of the vehicles.

It will be appreciated that this interconnection of the two vehicles is easy to release, viz. by causing the roller 138 to be lifted whereby the hook 114 is swung downwardly and thus out of engagement with the eye member of the preceding vehicle.

On the top side of the balk 90 there is rotatably mounted a disc to which the platform is secured. In this manner the vehicle may drive through a curve without forcing the platform to remain in the same longitudinal direction as the chassis, i.e. the platforms of two coupled together vehicles may be moved as a stiff unit through the curve, the two chassises acting as wheel boggies.

Before the vehicles arrive at the feeding station a stationary actuator member 148 having an inclined top surface serves to press all lowered rollers 140 up, i.e. to swing all hooks 114 to their raised, operative position; the actuator member 148 will not be operative to vehicles in which the hook is already raised.

Adjacent the front end of the feeding station there is mounted an actuator member 150 in the path of the inner rollers 138. This member is mounted on a carrier structure 152 at the end of the piston rod of a cylinder 154 which is shown embedded in the floor. The structure 152 comprises a rigid arm 156 extending through a vertically disposed cross slot 158 in a beam or rail 160 supporting the contact rail 100, the arm 156 carrying a rigid stop block 162 at the other side of the beam 160.

The cylinder 154 corresponds to the cylinder 58 in FIG. 4, i.e. it is adapted to effect stopping and release of the first vehicle in the feeding station in response to the function of the said article length detecting device. For stopping a vehicle the cylinder 154 is operated to lift the structure 150, 152, 156, and 162, whereby the actuation member 150 enters the path of movement of the rollers 138. The member 150 has an inclined top surface which, when engaged by the lowered roller 138, will serve to press up this roller and thereby to swing down the hook 114 into the inoperative position thereof. It will be understood that in this manner the preceding vehicle will be released from its connection with the hook 114.

By the simultaneous raising of the stop block 162 this block will reach a position in front of the front end of the elongated plate 108. By the arrival of the vehicle, therefore, the plate 108 will be held back by the block 162 so that by the continued movement of the vehicle the plate will be pressed rearwardly relatively to the vehicle, i.e. the sliding shoe 102 will be lifted from the contact rail and thus stop the vehicle.

Since at the entrance to the said accumulation line before the feeding station it is ensured that all hooks 114 are raised to or maintain their operative positions it will be understood that the next vehicle (and vehicles) that run into the rear end of the stopped vehicle will be coupled together therewith, as in the examples described in the foregoing. In order to simultaneously stop the motors of these vehicles the elongated plate 108 is of such a length that the rear end thereof will be hit by the front end of the corresponding plate of the next vehicle in such a manner that the plate 108 of the next vehicle will be pressed rearwardly and thus stop the motor of that vehicle in the moment where the hook thereof engages the eye member 142 of the first vehicle. Thus, the relative rearward pushing of the plate 108 with consequent motor stop will be effected on all vehicles driving up into the row of vehicles in the accumulation line, whether or not the arriving vehicles were already coupled together in groups of of vehicles (as formerly sent out from the feeding station).

When the first vehicle is to be released from the feeding station the cylinder is actuated to lower the entire structure 150, 152, 156, 162, whereby the roller 138 will maintain its raised position since the horizontal lever 124 is locked sufficiently by the notch 128 to resist shifting of the system by the weight of the arm 132, this weight even being balanced out by the weight of the lowered hook 114. When the stop block 162 is lowered the elongated plate is free to be pushed forwardly by the spring 115, so this will cause the motor to start and the vehicle to move out from the station. During stillstand in the feeding station the transmission between the wheels 96 and the motor 98 will prevent the spring 115 from causing the vehicle to be pushed back relatively to the plate 108 which could otherwise start the motor.

As soon as the plate 10 has been pushed forwardly the corresponding plate 108 in the next vehicle in the row will be correspondingly free to be pushed forwardly by its spring 115; in practice, therefore, the plates 108 of all the vehicles in the row will move forwardly so as to start all vehicles.

As long as the actuation member 150 is held in its low position in response to the detector means registering that an article is still under delivery from the feeding station the roller 138 of the following vehicle or vehicles will not be raised, i.e. these vehicles will remain coupled together corresponding to the length of the article being sent away, and since the plate 108 of these vehicles are both (or all) assuming their frontmost position the motors of both or all vehicles will remain switched on. When the cylinder 154 is again actuated in response to the article leaving or having left the station the next following vehicle will meet the raised structure members 150 and 162 whereby it will be coupled off from the last vehicle and its motor will be stopped.

Thus it will be noted that the functions of the vehicle shown in FIG. 7 will correspond to those of the embodiments described above and it will be understood that the different features may be selectively used in the different embodiments; e.g. the sliding switch actuator member 108 in FIG. 7 may substitute the end stop switch 46 in the embodiment shown in FIG. 4. Likewise, the arrangement for raising and lowering the end flaps of the platforms may be the same in the embodiment of FIG. 7 as described in connection with FIG. 6.

It will be appreciated that the free front hooks 114 of the individual vehicle or vehicle groups are inoperative as long as the vehicles are driving en route in the system, before they are made operative by the stationary member 148 at the entrance to the accumulation line; should for some reason a vehicle or vehicle group catch up with the foregoing vehicle or vehicle group in an unintentional manner they will hereby not be able to couple themselves together.

What is claimed is:

1. A conveyor system comprising a number of carrier vehicles each having a load supporting platform operable to receive articles to be conveyed, driving means for said vehicles, and means for guiding said vehicles along a predetermined track, said track extending past a feeding station and at least one unloading station, said feeding station adjacent said track having transfer means operable to transfer articles to said vehicles during presence of vehicles in said feeding station, said unloading station adjacent said track having means operable to effect unloading of said articles from the vehicles, said vehicles being provided with releasable coupling means operable to couple together two consecutive vehicles in such a manner that the load supporting platforms thereof form a substantially unbroken platform of a length bigger than that of the platform of a single vehicle, detector means being provided adjacent said feeding station for detecting the length of each article transferred to said vehicles, said detector means being operatively connected to actuator means for said coupling means so as to effectively provide coupling together of at least two consecutive vehicles in response to said detector means detecting the length of an article under transfer from the feeding station to exceed the length of the platform of a single vehicle.

2. A conveyor system as claimed in claim 1 in which said feeding station comprises stop means mounted adjacent said track and operable to stop an unloaded vehicle during its passage of the feeding station in a position in which the vehicle is ready to commence receiving of an article to be transferred thereto, and release means operable to start said vehicle in response to actual article transfer thereto, said release means being operatively connected to said article length detecting means so as to prevent stopping of the vehicle following said started vehicle in response to said detecting means registering the article length to exceed the length of the platform of the first article.

3. A conveyor system as claimed in claim 2 and further comprising a vehicle accumulation station operable to accumulate unloaded vehicles moving along said track towards said feeding station in a row of closely accumulated consecutive vehicles, means being provided to effect coupling together of the consecutive vehicles before they enter the feeding station, said coupling actuator means in said feeding station having inverted function so as to effectively provide release of the interconnection between the rear end of a vehicle carrying the rear end of an article to leave the feeding station and the front end of the following vehicle.

4. A conveyor system as claimed in claim 3, in which said coupling means are of the type capable of providing interlocking between two consecutive vehicles in response to a following vehicle driving against the rear end of a leading vehicle.

5. A conveyor system as claimed in claim 4, in which said coupling means are adjustable between a position in which they are operable to couple together two consecutive vehicles in response to these vehicles driving against each other and an inoperative position in which they are unable to effect such coupling together, whereas at the entrance to said accumulation station there is provided stationary actuator means operable to cause the coupling means of all vehicles arriving at the accumulation station with their coupling means in said inoperative positions to be brought into said operative positions, whereas said coupling actuator means in said feeding station are operable to bring the coupling means between two inter-released vehicles into their inoperative positions.

6. A conveyor system as claimed in claim 4, in which each vehicle is provided with an article stop member adjacent each end of said platform, said stop members each being individually movable between a raised position in which they extend substantially vertically above the end of the platform and a lowered position at the highest in level with the platform, whereas in connection with the feeding station actuator means are provided for raising the stop member at the front end of the first article receiving vehicle and for correspondingly raising the stop member at the rear end of the last vehicle leaving the station with the particular article, said vehicles having means for releasably retaining the stop members in the raised positions thereof, stationary release means being provided between the last discharging station and the feeding station, said release means being operable to effect lowering of all raised stop members of unloaded vehicles approaching the position of said first article receiving vehicle in the feeding station.

7. A conveyor system according to claim 6, in which the said stop members are constituted by flaps hinged to the front edge, respectively the rear edge of the supporting platforms, whereas the means for interlocking consecutive vehicles are adapted so as to maintain such a spacing between the platforms of the vehicles that the space therebetween is bridged by the said flaps in swung down horizontal positions thereof.

8. A conveyor system according to claim 7, in which the coupling means are mounted in direct association with said flaps so as to be operative when the flaps assume their swung down horizontal positions.

9. A conveyor system according to claim 2, in which each vehicle is provided with an individual driving motor and with switch means operable to stop the motor in response to the vehicle driving against a preceding, stopped vehicle and to start the motor in response to the preceding vehicle again starting its movement.

10. A conveyor system according to claim 1, in which in the feeding station the vehicles are operable to pass closely underneath a loading table on which the articles to be fed to the vehicles are advanced with a velocity corresponding to the driving velocity of the vehicles so as to move out over the free end of the loading table for being deposited on the vehicles as these are moved past the said free table end, whereas said detector means are constituted by stationary means for registering the passage of the front end as well as the passage of the rear end of each article so as to effect release of the first vehicle in the feeding station in response to passage of the front end of the article past said detector means and to effect disengaging between the vehicle receiving the rear end of said article and the following vehicle in response to passage of said rear end of the article past said detector means.

* * * * *